(12) United States Patent
Boutaghou

(10) Patent No.: US 6,545,974 B1
(45) Date of Patent: Apr. 8, 2003

(54) DISC MEDIA AND METHODS FOR FABRICATING

(75) Inventor: Zine-Eddine Boutaghou, Vadnais Heights, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/413,161

(22) Filed: Oct. 6, 1999

Related U.S. Application Data

(60) Provisional application No. 60/109,109, filed on Nov. 18, 1998.

(51) Int. Cl.$^7$ ................................................. G11B 5/84
(52) U.S. Cl. ....................................................... 369/290
(58) Field of Search ................................ 369/290, 288, 369/280; 360/133

(56) References Cited

U.S. PATENT DOCUMENTS

| | | | | |
|---|---|---|---|---|
| 4,604,664 A | * | 8/1986 | Barski | 360/133 |
| 4,780,383 A | | 10/1988 | Garrett et al. | |
| 4,789,965 A | | 12/1988 | Michl et al. | |
| 4,827,469 A | * | 5/1989 | Peeters | 369/280 |
| 4,864,537 A | | 9/1989 | Michl et al. | |
| 5,016,240 A | * | 5/1991 | Strandjord et al. | 369/288 |
| 5,060,106 A | * | 10/1991 | Davis et al. | 360/133 |
| 5,197,049 A | | 3/1993 | Wehrenberg | |
| 5,299,186 A | * | 3/1994 | Tsurushima | 369/291 |
| 5,352,947 A | | 10/1994 | MacLeod | |
| 5,414,574 A | | 5/1995 | Boutaghou et al. | |
| 5,573,847 A | | 11/1996 | Treves et al. | |
| 5,707,728 A | | 1/1998 | Brekner et al. | |
| 5,742,581 A | | 4/1998 | Ja | |
| 5,871,621 A | | 2/1999 | Ross | |
| 5,875,082 A | | 2/1999 | Takayama et al. | |
| 5,875,083 A | | 2/1999 | Oniki et al. | |
| 5,875,084 A | | 2/1999 | Baumgart et al. | |
| 6,180,201 B1 | * | 1/2001 | Sandstrom | 369/288 |
| 6,185,069 B1 | * | 2/2001 | Schick | 360/133 |

* cited by examiner

*Primary Examiner*—Allen Cao
(74) *Attorney, Agent, or Firm*—Merchant & Gould P.C.

(57) ABSTRACT

A polymeric media with increased mechanical performance includes a signal transduction region having a nominal thickness and a clamp system integrally attached to the interior diameter of the disc. The thickness of the media is tailored, with respect to its modulus of elasticity, to provide planar stiffness at least equal to metal-based media, assuring stability at a small sacrifice and overall height of the drive system. The interior clamp, which is advantageously molded integrally with the signal transduction portion of the media, can incorporate a spacer section, so as to be seated on a shoulder on the spindle mechanism, or allow stacking of discs on a common spindle. The interior clamp configuration including conical fingers which snap into place on the spindle during installation and thereafter maintain concentricity during rotation, without other attachments. Protruding contact elements may be integrally formed along a radial band on the disc used for head landing area, so as to minimize stiction during starting and stopping.

23 Claims, 5 Drawing Sheets

DISC MEDIA AND METHODS FOR FABRICATING

REFERENCE TO PRIOR APPLICATION

This application claims the benefit of provisional application Ser. No. 60/109,109, entitled "INJECTION MOLDED MEDIA WITH INTEGRAL CLAMP AND SPACER," filed on Nov. 18, 1998.

FIELD OF THE INVENTION

This invention relates to planar media for high density recording and reproduction, and more particularly to devices and methods for providing low cost but high performance media and methods of fabricating the same.

BACKGROUND OF THE INVENTION

As the art of recording and reproducing data from rotating media have advanced, cost performance factors have reached levels that were once thought unobtainable. By improving the media surfaces so that surface asperities are of the order of a microinch or less, by using highly efficient transducers interactive with very narrow track widths, and by aerodynamic designs which maintain the transducers at microinch or less gaps from the media surface, the number of tracks per inch and the number of bits per inch along the track have been increased by orders of magnitude, and continue to increase. At the same time, the need for mass production of the discs, head access systems and transducer devices has been met so that at this time disc drives using magnetic and magneto optical technology are commercially available that have capacities in the gigabyte range at costs which are, even for single piece quantities, in the low hundreds of dollars.

This constant refinement and improvement continues, and advances in media technology are an area of significant interest. Whereas the conventional approach has been to utilize metal and metal-based discs, i.e., aluminum, some designers have more recently utilized polymeric materials, which can be molded to shape, and then surfaced with successive layers for the desired magnetic or magneto-optical properties. These approaches have been directed toward arrangements that are in large measure, the equivalent of aluminum discs. In other words, have been designed so as to be 1:1 equivalents of metal discs, in their form factors and methods of attachment to the drive spindle. An exception is a small disc which has been molded as a single piece, integral with the central spindle, but this is a specialized version of limited general utility, because it is designed for a low cost unit of very small form factor.

The strategy of using polymeric materials for higher performance units, continues to suffer performance drawbacks. Both track registration and flyability (transducer to media spacing) are adversely affected because the media is not sufficiently stable to meet the exactness required of transducer radial position and flying height reference.

SUMMARY OF THE INVENTION

Polymeric media in accordance with the invention are configured, in relation to a central supporting drive spindle, to be integral units having an interior clamp configuration that snaps into place on the spindle and thereafter maintains concentricity during rotation, without other attachments. Further, the thickness of the media is tailored, with respect to its modulus of elasticity, to provide planar stiffness at least equal to metal-based media, assuring stability at a small sacrifice and overall height of the drive system. Furthermore, the interior clamp, which is advantageously molded integrally with the signal transduction portion of the media, can incorporate a spacer section, so as to be seated on a shoulder on the spindle mechanism, or allow stacking of discs on a common spindle. Furthermore, protruding contact elements may be integrally formed along a radial band on the disc used for a head landing area, so as to minimize stiction during starting and stopping.

In an example of an integral polymeric disc in accordance with the invention, the active recording area includes a structure of uniform thickness in which the product of the modulus of elasticity and the cube of the disc thickness provides a stiffness at least equal to that of a metal-based disc. The disc includes an interior integral clamp area in the form of a shallow conical surface having interior fingers spaced circumferentially about an interior bore sized to fit with pressure on a given spindle. The spindle has an uppermost cap member with respect to which the fingers expand as the disc is moved down into position over the cap, and then snapped into place against the outer circumference of the spindle below the cap. A circumferential band on the surface of the media encompassing the head landing area for start and stop operations includes multiple integrally molded projections to reduce stiction and minimize wear.

According to a first aspect of the invention, there is provided a rotatable device for signal recording and reproduction operations where the device has a rotatable spindle and a planar disc body. The planar disc body includes a molded member of polymeric material which has a signal transduction portion of a constant thickness. The thickness is large enough to reduce off track motion due to nonrepeatable runouts. Also included is a deformable inner radial hub coupled to an inner radial disc region of the planar body where the deformable inner radial hub has resilient members disposed about a central bore and sized to seat against the spindle circumference.

According to a second aspect of the invention, there is provided a rotatable device that has a rotatable spindle and a planar disc body. The planar disc body includes a molded member of polymeric material that has a principal signal transduction portion of constant thickness. The thickness is large enough to reduce off track motion due to non-repeatable runout. Also included is a deformable inner radial hub coupled to an inner radial disc region of the planar body.

According to a third aspect of the invention, there is provided a device for reducing frictional heating and friction between a recordable disc and a read/write head during the initiation and termination of disc rotation. The device includes a planar disc body with a plurality of protrusions in a radial band along a control bore of the disc and a read/write head wherein a pad is coupled to a contact surface of the head, interposed between the head and the central bore.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
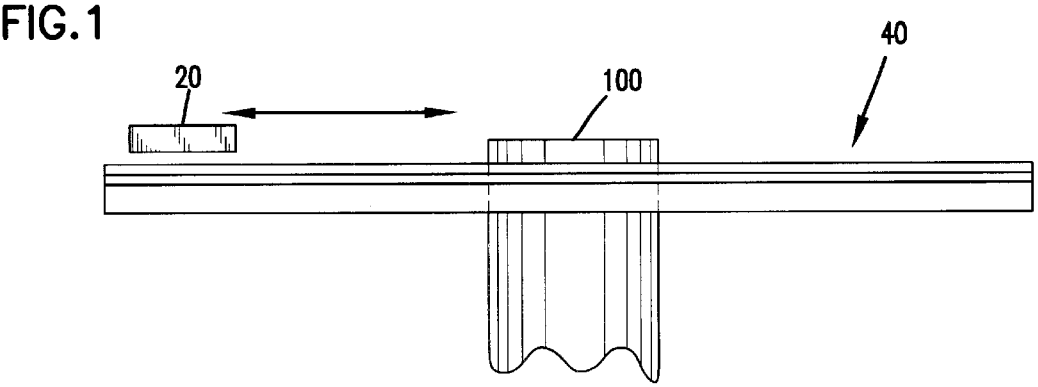
FIG. 1 is a side view of portions of a conventional disc drive system and recording disc.

Conventional disc drive systems typically include one or more recording discs mounted for relatively high speed rotation on a central spindle. For example, FIG. 1 shows a side view of portions of a conventional disc drive system, including a conventional data storage or recording disc 40 supported on a spindle 100. A disc drive motor (not shown) is operatively coupled to the spindle 100 for rotation of the spindle and the disc supported thereon. A recording and/or reading head 20 is supported by suitable head support structure (not shown) adjacent the recording surface of the disc. To simplify the disclosure, FIG. 1 is shown with a single recording disc 40 having a single recording surface and a single head 20. However, other conventional disc drive systems employ multiple discs, double-sided discs (discs with recording surfaces on both surfaces) and multiple heads.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly.

The surfaces of the stacked discs are accessed by the read/write heads which are mounted on a complementary stack of actuator arms which form a part of an actuator assembly. Generally, the actuator assembly has an actuator body that pivots about a pivot mechanism disposed in a medial portion thereof. A motor selectively positions a proximal end of the actuator body. This positioning of the proximal end in cooperation with the pivot mechanism causes a distal end of the actuator body, which supports the read/write heads, to move radially across the recording surfaces of the discs, such that the head may be selectively positioned adjacent any recording location on the recording surface as the disc is rotated.

In operation, the head 20 is moved in the radial direction to align or register with a desired track location on the recording surface of the disc. Once aligned or registered with the desired track location, the head 20 reads or writes information onto the recording surface. Because the tracks are very narrow and very closely spaced, in the present state of the art, dimensional precision and stability are of paramount importance. It is important not only to properly register the head 20 with the track location to effect accurate reading and writing operations, but also to have a surface that enables the head flying height to be stable at the extreme spacings that are currently used. To achieve these physical properties with an economically justifiable mass produceable product, the principal approach has been to employ metal (e.g. aluminum) substrates with active media layers. Currently, disc drives using magnetic and magneto optical technology are commercially available, however, magneto optical disc suffer a number of performance drawbacks, as both track registration and liability (transducer to media spacing) are adversely affected because the media is not sufficiently stable to meet the precision demanded as a transducer radial position and flying height.

Figure 2:
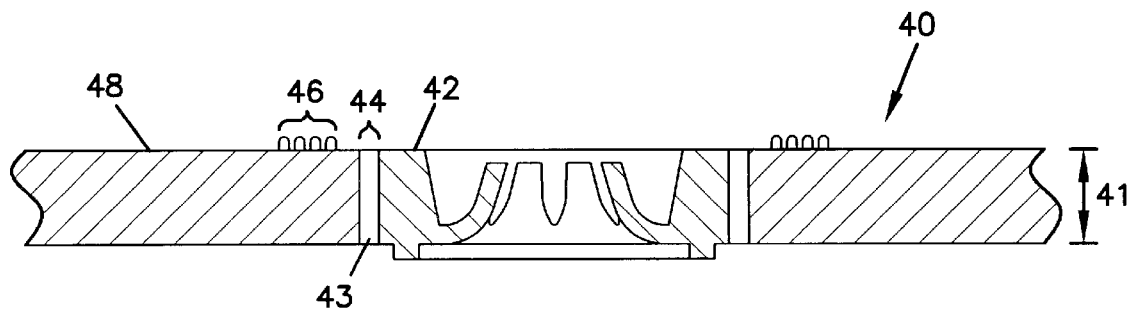
FIG. 2 is a side sectional view of a polymeric disc in accordance with the invention, having transition, clamp and landing regions.

The present invention is more specifically directed to a polymeric data storage disc fabricated with improvements so as to improve mechanical stability in terms of the accuracy of track registration, minimization of stiction/friction between the disc and head, and flyability performance. FIG. 2 depicts a preferred embodiment of such a disc. The disc 40 comprises a track registration region 48, a landing zone 46, a transition region 44 and a clamp system 42.

In preferred embodiments of the invention, the track registration region 48, having a nominal thickness 41, comprises a composition of polymers which perform under the forces of operating conditions with mechanical properties at least as good as existing aluminum discs. To minimize flyability variations, the stiffness of the disc 40 within the registration region 48 is improved over a conventional polymeric disc. To achieve the goal of making the polymeric disc media 40 as stiff as existing aluminum discs, the polymeric disc thickness 41 is increased such that the ratio of the Young's modulus of the polymeric disc 40 by the cube of the disc thickness 41 is greater than that of an aluminum disc, or $E_p t_p^3 > E_{Al} t_{Al}^3$. For example, a polymer based disc with a thickness of 100 mils will be mechanically superior to aluminum disc of 31 mils thickness. The thickness 41 of the polymeric disc 40 may be in the range of about 75–125 mils, and is most preferably about 100 mils. More generally, the thickness is selected to provide a stiffness that is large enough to reduce off track motion due to nonrepeatable runouts.

Figure 3:
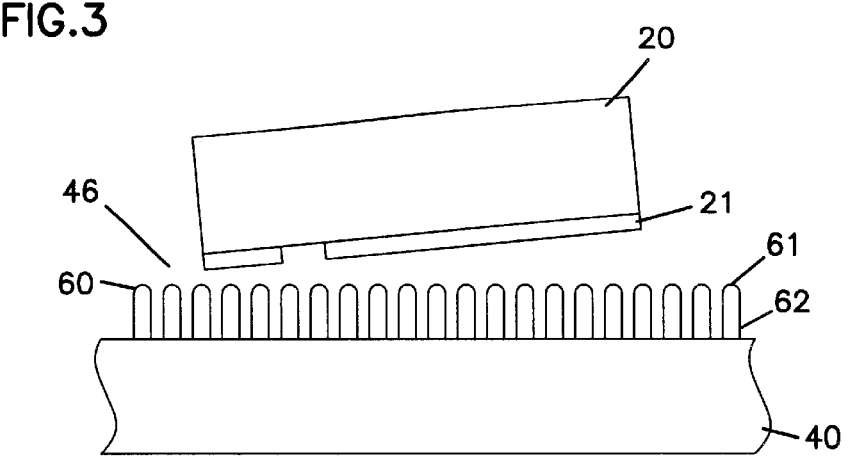
FIG. 3 is a side view of the landing zone region of the polymeric disc in FIG. 3 is accordance with the invention.

A head landing zone 46 is located along the inner diameter of the registration region 48. As shown in FIG. 3, the landing zone has a texturized surface, including a plurality of radially spaced protrusions or bumps 60 in a circumferential band about the central axis. The bumps 60, having a height of approximately 50–200 Å are somewhat conical in shape and include a rounded tip 61 and a base 62, wherein the base 62 is preferably wider than the tip 61. The bumps 60 are integrally molded into the inner diameter of the registration region 48 as the disc is fabricated. The landing zone is most effective when used in combination with a slider head 20 having diamond-like-carbon (dlc) coated pads 21 on its lower surface to minimize wear of the polymer based media 40 and reduce frictional heating and friction between the disc 40 and the slider head 20 during takeoff and landing. Because there are spaces between the small protrusions 60 and only limited contact areas with the slider head 20, stiction is not a problem.

Figure 4:
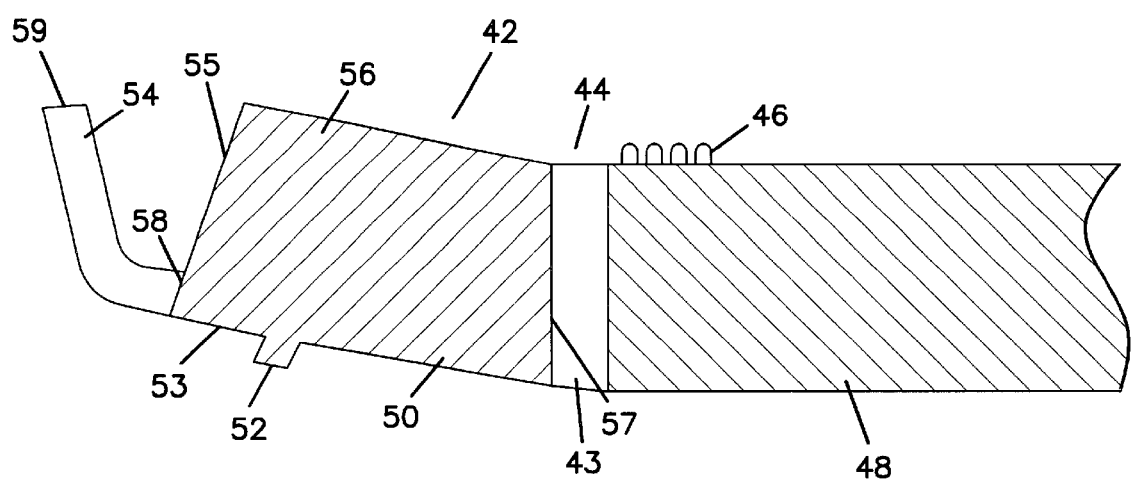
FIG. 4 is a fragmentary sectional view of the transition and clamp regions of the polymeric disc in FIGS. 2 and 3, showing further details thereof.

With reference to FIG. 4, the transition region 44 couples the track registration region 48 to the clamp system 42. The transition region 44 includes a single row of circumferentially spaced perforations 43, which aid in providing flexibility within the inner regions of the disc. In alternative embodiments, the transition region 44 may include solid polymer material.

Coupled to the transition region 44 of the disc 40 is a clamp system 42. In preferred embodiments, the clamp 42 is integrally fabricated with the disc 40 during the molding operation and uses the same material used in the disc registration region 48. The design of the clamp 42 is not particularly limited in form or shape so long as it functions to secure the disc 40 to the spindle 100. It is preferred that no additional components, other than the clamp 42, are required to assemble the disc 40 on to the spindle 100. One embodiment of the integral clamp system 42 is a snap-fit clamp comprising a clamp base 56, a plurality of fingers 54 and a retaining ring 52. The base 56 is an annular disc having an inner diameter 55, an outer diameter 57 and a contact surface 53. The outer diameter 57 of the base 56 is integrally coupled to the inner diameter of the registration region 48 at the transition region 44.

The plurality of conically shaped fingers 54 includes polymeric materials having compliant mechanical properties. The fingers 54 include a base surface 58 and a contact surface 59. The fingers 54 are integrally coupled to the inner diameter 55 of the base 56 along the base surface 58 and extend radially inward, in an L-shaped configuration, such that the contact surface 59 locks within the spindle groove.

Coupled to the contact surface 53 of the base 56 is the annularly shaped retainer ring 52. The retainer ring 52 is designed to engage an annular groove within the spindle hub, for retaining and aligning the disc 40 relative to the spindle assembly.

The polymeric material used in the disc 40 is not particularly limited so long as it is preferably relatively free from impurities and fillers. Examples of polymers which may be useful in the invention include but are not limited to Ultem from General Electric or a polycarbonate.

In preferred embodiments, the disc 40 is formed by injection molding of a polymer into a mold of suitable thickness. Alternatively, disc 40 may be formed by a sandwich structure using a solid core material.

Figure 5:
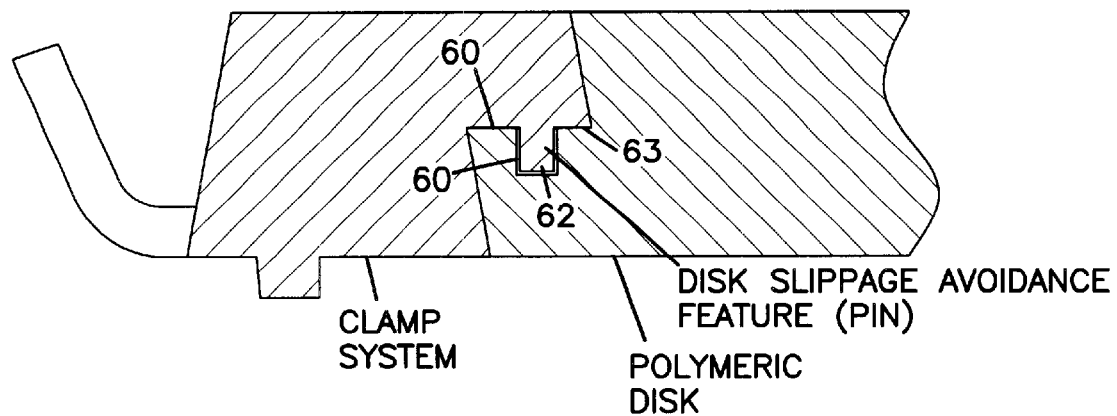
FIG. 5 is a fragmentary sectional view showing an alternative form of the transition and clamp regions of the polymeric disc in FIG. 4 in accordance with the invention.

In alternative embodiments, as depicted in FIG. 5, the clamp 42 is attached to the inner region of disc 40 in the transition region 44 at an interface surface 60. The clamp 42 is secured to the inner region of the disc 40 at the interface surface 60 by an adhesive or other securing means, including, but not limited to, threaded fasteners, or it can be secured by an interference fit, for example. In this embodiment, a plurality of depressions 61 are radially positioned along the interface surface 60 to receive a plurality of protruding members 62, which extend from a contact surface 63 of the clamp 42. The members 62 aid in avoiding disc slippage during a sudden shock or jolt of the device.

Figure 6:
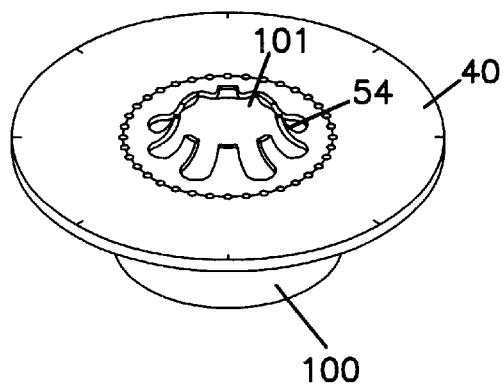
FIG. 6 is a perspective view of the polymeric disc in FIGS. 2–4 during installation on a spindle in accordance with the invention.
Figure 7:
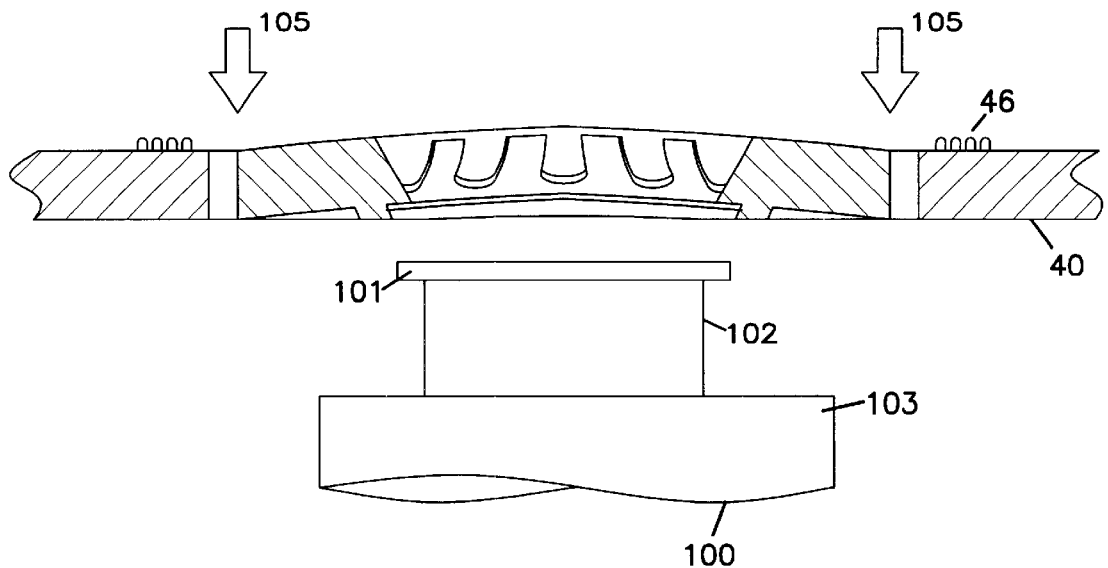
FIG. 7 is a partial sectional view of the hub region of the spindle and polymeric disc of FIG. 6.
Figure 8:
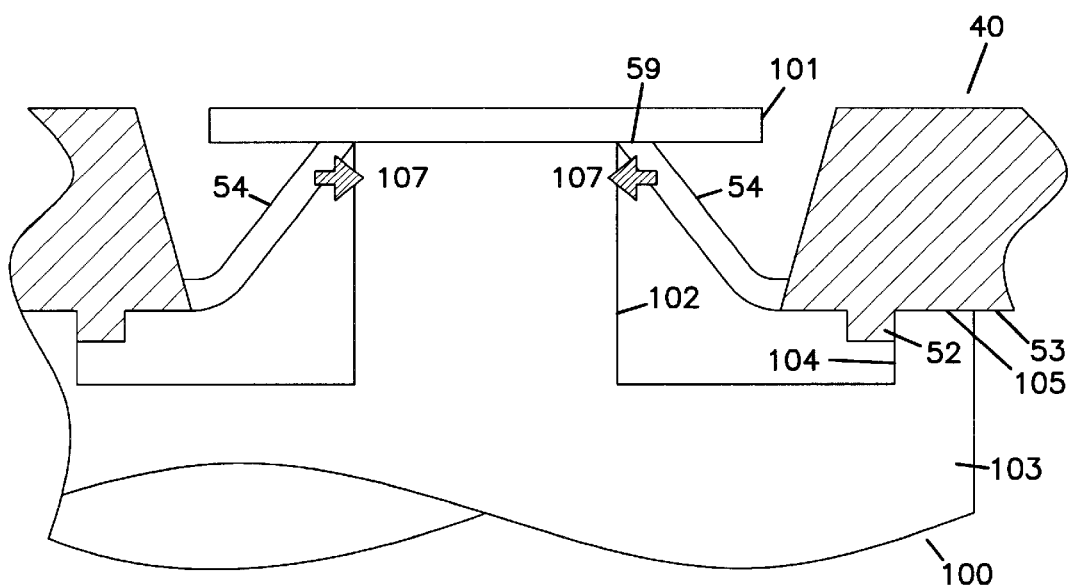
FIG. 8 is a partial sectional view of the hub region of the spindle and polymeric disc in FIG. 7 after installation in accordance with the invention.

As depicted in FIGS. 6–8, attachment of the disc 40 to the spindle 100 results when a downward pressure 105 is applied to the inner diameter of the disc 40 as it is placed over the spindle top 101. The applied downward force 105 deforms the clamp 42, enabling the fingers 54 to insert into the spindle groove 102. Once within the spindle groove 102, a clamping force 107 is generated because of the conical clamp deformation and this force presses the clamp finger 54 against the spindle groove 102, and the tab 52 against a spindle retaining groove 104 to hold the disc securely in place. The disc 40 is further secured to the spindle 100 at the spindle top 101, at the contact surface 59 of the conical fingers 54 locks in contact against the lower surface 106 of the spindle top 101. Support and alignment of the disc 40 relative to the spindle axis takes place along the spindle hub 103, as the clamp contact surface 53 rests against the contact support surface 105.

Figure 9:
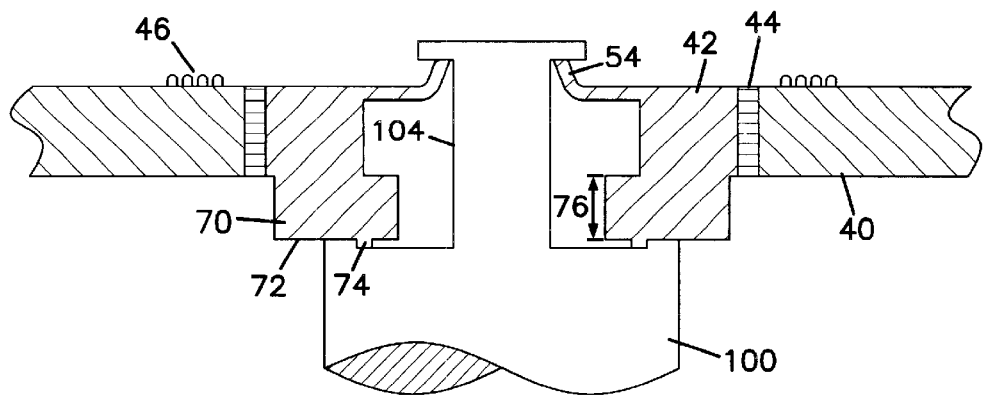
FIG. 9 is a partial sectional view of an alternative embodiment of a polymeric disc in accordance with the invention.

In a second embodiment, shown in FIG. 9, the polymeric disc 40 comprises a spacer 70 integrally coupled to the base surface 58 of the clamp 42. The spacer 70 is fabricated during the molding operation and includes the same material as used in the disc registration region 48. The design of the spacer 70 is not particularly limited in form or shape so long as it functions to engage the disc 40 with a lateral surface 105 of the spindle hub 103 and separate discs within a disc stack. The spacer 70 can be designed so as to be a defined thickness 76 in order to accommodate a head-arm assembly in between the two discs which the spacer 70 separates. The spacer 70 is located in the inner diameter of the disc 40, and is preferably located centrally to the transition zone 44, beneath the lowermost surface of the readable portion of the disc 48. The retaining ring 74 snaps into the spindle retaining groove 104.

Figure 10:
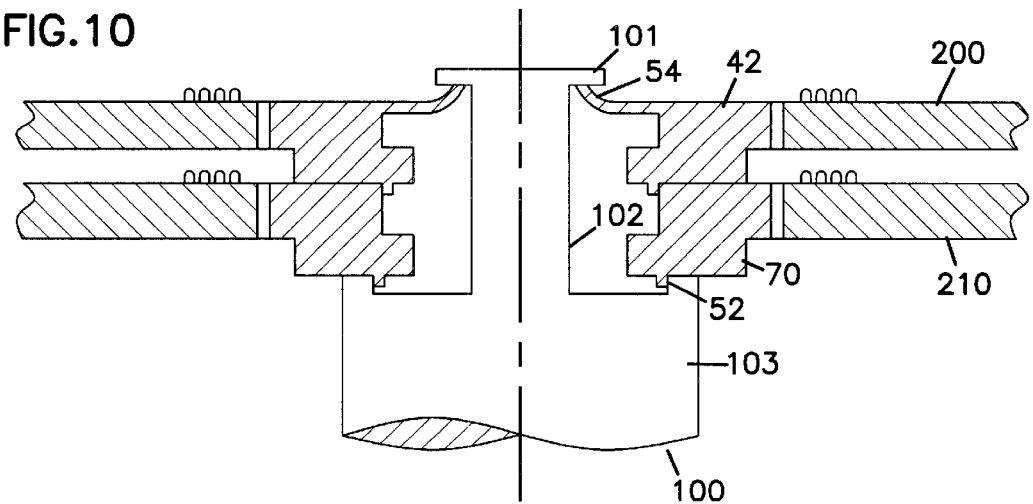
FIG. 10 is a partial sectional view of the disc in FIG. 9 in a disc stack configuration in accordance with the invention.
Figure 11:
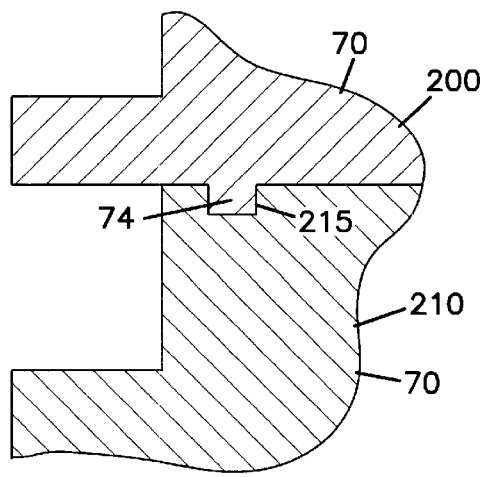
FIG. 11 is fragmentary sectional view of the spacer and integral spacer regions of the discs stacked in FIG. 10 in accordance with the invention.

In a further embodiment, as depicted in FIG. 10, a number of discs are stacked in a multiple disc unit, with the uppermost disc 200 including a clamp 42 and spacer 70 and subsequent discs 210 including only a spacer 70. In this embodiment, as shown in FIG. 11, the spacer 70 may have elements 74 on the upper or lower surface, for example tabs or slots as shown in FIG. 11, which interact with mating elements 215 on the surface of an adjacent disc or the spindle which facilitate and secure the alignment of discs in the stack. In a preferred embodiment, a retaining ring 74 is coupled to the integral spacer 70 along a contact surface 72. The retaining ring 74 snaps into the spindle retaining groove 104 (see FIG. 9) or a spacer retaining groove 215, where there are more than one disc in a stack, to hold the disc or discs in place.

The above specification, examples and data provide a complete description of the manufacture and use of the invention. Since many embodiments of the invention can be made without departing from the spirit and scope of the invention, the invention resides in the claims hereinafter appended.

I claim:

1. A rotatable device for signal recording and reproduction operations comprising:

a rotatable spindle having a spindle shaft and a protruding shoulder;

a planar disc body having a thickness between 0.075 and 0.125 inches, the planar disc body comprising a molded member of polymeric material, the member having a principal signal transduction portion having a constant thickness, wherein the portion has a stiffness large enough to reduce off track motion due to nonrepeatable runouts; and a deformable inner radial hub, coupled to an inner radial disc region of the planar disc body, having resilient members disposed about a central bore and sized to seat against the spindle circumference, wherein said resilient members include an upper surface that engage the shoulder of the spindle when the hub is placed on the spindle.

2. A rotatable device for signal recording and reproduction operations comprising:

a rotatable spindle having a spindle shaft;

a planar disc body comprising a molded member of polymeric material, the member having a principal signal transduction portion having a constant thickness, wherein the portion has a stiffness large enough to reduce off track motion due to nonrepeatable runouts;

a deformable inner radial hub, coupled to an inner radial disc region of the planar disc body, having resilient members disposed about a central bore and sized to seat against the spindle circumference; and wherein the spindle includes a concentric cap member of greater radius than the spindle shaft, and a retaining groove etched into a landing surface on a base portion of the spindle, wherein the resilient members on the inner radial hub are sized to seat without deflection from the centrifugal forces on the spindle when the system is at nominal operating rotational velocity.

3. A device as set forth in claim 2, wherein the cap member comprises a threaded bore to engage with a threaded portion of the spindle shaft to allow disc disassembly.

4. A device as set forth in claim 2, wherein the inner radial hub is a clamp member having a shallow conical configuration and the members comprise a plurality of deformable interiorally directed fingers that are bendable along the spindle radial axis.

5. A device as set forth in claim 4, wherein the clamp member comprises a retaining member extending from a landing surface of the clamp in an annular configuration, engaging with the spindle retaining groove.

6. A device as set forth in claim 5, wherein the clamp member is integrally molded with the planar disc.

7. A device as set forth in claim 5, wherein the clamp member is fastened to the inner disc region, the inner disc region and the clamp member having engageable features to avoid disc slippage during a shock event.

8. A device as set forth in claim 5, wherein the clamp member comprises a integral spacer engageable against a lateral surface on the spindle base portion, to define the vertical position of the device relative to the spindle axis.

9. A device as set forth in claim 8, wherein an annular retaining member extends from a bottom landing surface of the integral spacer, engaging with the spindle retaining groove.

10. A device as set forth in claim 1, wherein the disc has a landing area for start stop operations, and wherein the disc further comprises a plurality of protrusions in a radial band along the landing area, the protrusions being integrally molded to provide a contact area for a transducer mechanism.

11. A device as set forth in claim 1, wherein the spindle mechanism includes a registration surface spaced at a selected radius from the central axis of the spindle, and wherein the disc structure includes a complimentary mating surface engaging the registration surface, for ensuring the radial positioning of the disc relative to the spindle central axis.

12. A rotatable device for signal recording and reproduction operations comprising:
    a rotatable spindle having a protruding shoulder;
    a planar disc body having a thickness between 0.075 and 0.125 inches, the planar disc body comprising a molded member of polymeric material, the member having a principal signal transduction portion having a constant thickness, the portion having a stiffness large enough to reduce off track motion due to nonrepeatable runout; and
    a deformable inner radial hub, coupled to an inner radial disc region of the planar disc body, wherein the hub includes inwardly extending fingers that engage the protruding shoulder.

13. A device as set forth in claim 12, wherein the inner radial hub is a clamp member having a shallow conical configuration.

14. A device as set forth in claim 13, wherein the clamp member comprises a retaining member extending from a landing surface of the clamp in an annular configuration, engaging with the spindle retaining groove.

15. A rotatable device for signal recording and reproduction operations comprising:
    a rotatable spindle;
    a planar disc body comprising a molded member of polymeric material, the member having a principal signal transduction portion having a constant thickness, the portion having a stiffness large enough to reduce off track motion due to nonrepeatable runout; and
    a deformable inner radial hub, coupled to an inner radial disc region of the planar disc body, wherein the inner radial hub is a clamp member having a shallow conical configuration and wherein the clamp member comprises a retaining member extending from a landing surface of the clamp in an annular configuration, engaging with the spindle retaining groove and wherein the clamp member is integrally molded with the planar disc.

16. A device as set forth in claim 14, wherein the clamp member is fastened to the inner disc region, the inner disc region and the clamp member having engageable features to avoid disc slippage during a shock event.

17. A device as set forth in claim 14, wherein the clamp member comprises a integral spacer engageable against a lateral surface on the spindle base portion, to define the vertical position of the device relative to the spindle axis.

18. A device as set forth in claim 17, wherein an annular retaining member extends from a bottom landing surface of the integral spacer, engaging with the spindle retaining groove.

19. A device as set forth in claim 17, wherein an annular retaining groove is etched into an upper landing surface of the clamp member.

20. A device as set forth in claim 19, wherein the device comprises at least two planar discs, and the discs stack about the spindle, spacer to spacer, with only the uppermost disc having the interiorally directed fingers.

21. A device as set forth in claim 11, wherein the disc has a landing area for start stop operations, and wherein the disc further comprises a plurality of protrusions in a radial band along the landing area, the protrusions being integrally molded to provide a contact area for a transducer mechanism.

22. A device as set forth in claim 11, wherein the spindle mechanism includes a registration surface spaced at a selected radius from the central axis of the spindle, and wherein the disc structure includes a complimentary mating surface engaging the registration surface, for ensuring the radial positioning of the disc relative to the spindle central axis.

23. A device for reducing frictional heating and friction between a recordable disc and a read/write head during the initiation and termination of disc rotation, comprising:
    an injection molded planar disc body having a thickness between 0.075 and 0.125 inches, the planar disc body having a plurality of protrusions in a radial band along a central bore of the disc;
    disc centering means coupled to the disc body; and
    a read/write head, wherein a pad is coupled to a contact surface of the head, interposed between the head and the central bore.

* * * * *